United States Patent
Camp et al.

(10) Patent No.: US 9,389,792 B1
(45) Date of Patent: Jul. 12, 2016

(54) REDUCING READ-AFTER-WRITE ERRORS IN A NON-VOLATILE MEMORY SYSTEM USING AN OLD DATA COPY

(71) Applicant: INTERNATIONAL BUSINESS MACHINES CORPORATION, Armonk, NY (US)

(72) Inventors: Charles J. Camp, Sugar Land, TX (US); Timothy J. Fisher, Houston, TX (US); Nikolas Ioannou, Zurich (CH); Roman A. Pletka, Zurich (CH); Sasa Tomic, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/960,631

(22) Filed: Dec. 7, 2015

(51) Int. Cl.
G06F 12/00 (2006.01)
G06F 3/06 (2006.01)
G06F 12/02 (2006.01)

(52) U.S. Cl.
CPC ............ *G06F 3/0619* (2013.01); *G06F 3/061* (2013.01); *G06F 3/0655* (2013.01); *G06F 3/0688* (2013.01); *G06F 12/0246* (2013.01); *G06F 12/0253* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| 7,490,283 | B2 | 2/2009 | Gorobets et al. |
| 7,697,326 | B2 | 4/2010 | Sommer et al. |
| 2014/0149698 | A1* | 5/2014 | Ezra .................. G06F 3/0614 711/162 |
| 2014/0281767 | A1 | 9/2014 | Alhussien et al. |
| 2015/0067415 | A1 | 3/2015 | Miyamoto et al. |
| 2015/0149698 | A1 | 5/2015 | Cai et al. |

FOREIGN PATENT DOCUMENTS

EP 1898312 A1 3/2008

OTHER PUBLICATIONS

Yu Cai et al., "Error Patterns in MLC NAND Flash Memory: Measurement, Characterization, and Analysis", IEEE, 2012.

* cited by examiner

*Primary Examiner* — Kevin Verbrugge
*Assistant Examiner* — Craig Goldschmidt
(74) *Attorney, Agent, or Firm* — Brian F. Russell; Randall J. Bluestone

(57) ABSTRACT

Following a relocation write in which data is relocated without update from an old physical location to a new physical location within the non-volatile memory array, a controller defers an update of a logical-to-physical translation (LPT) entry to associate a logical address of the data with a new physical address of the new physical location, for example, for a time-out period. During deferment of the update to the LPT entry, the controller services a read request targeting the logical address from data at the old physical location. In response to no update to the data being made during deferment of the update to the LPT entry, the controller performs the deferred update to the LPT entry. In response to an update to the data being made during the deferment of the update to the LPT entry, the controller refrains from performing the deferred update to the LPT entry.

20 Claims, 10 Drawing Sheets

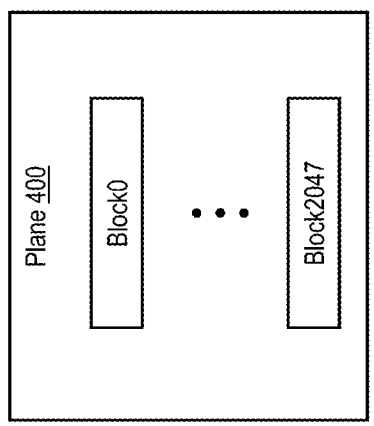 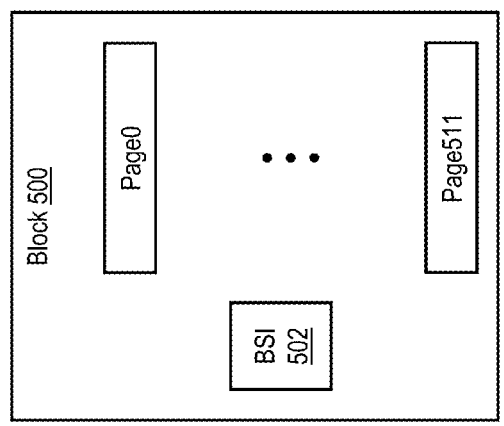
Fig. 4
Fig. 5

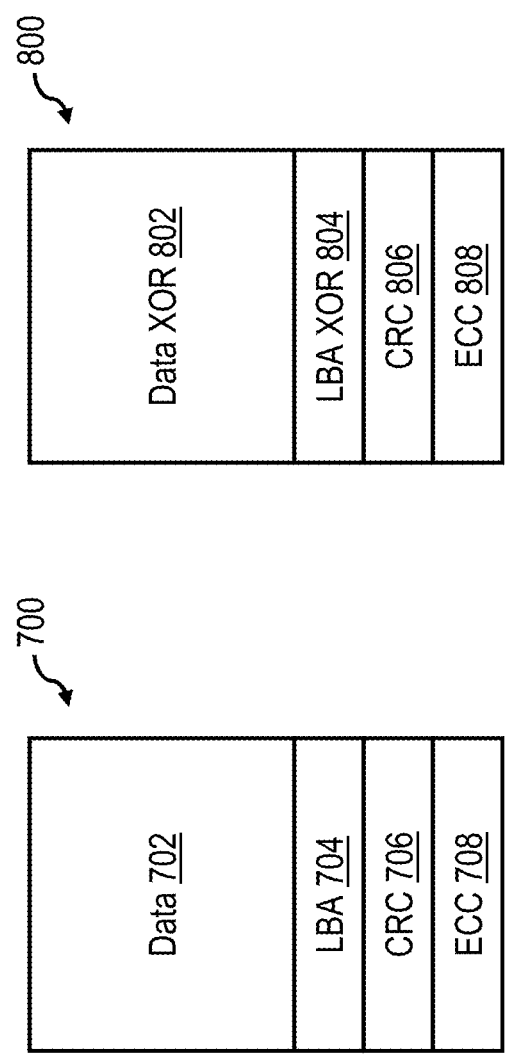

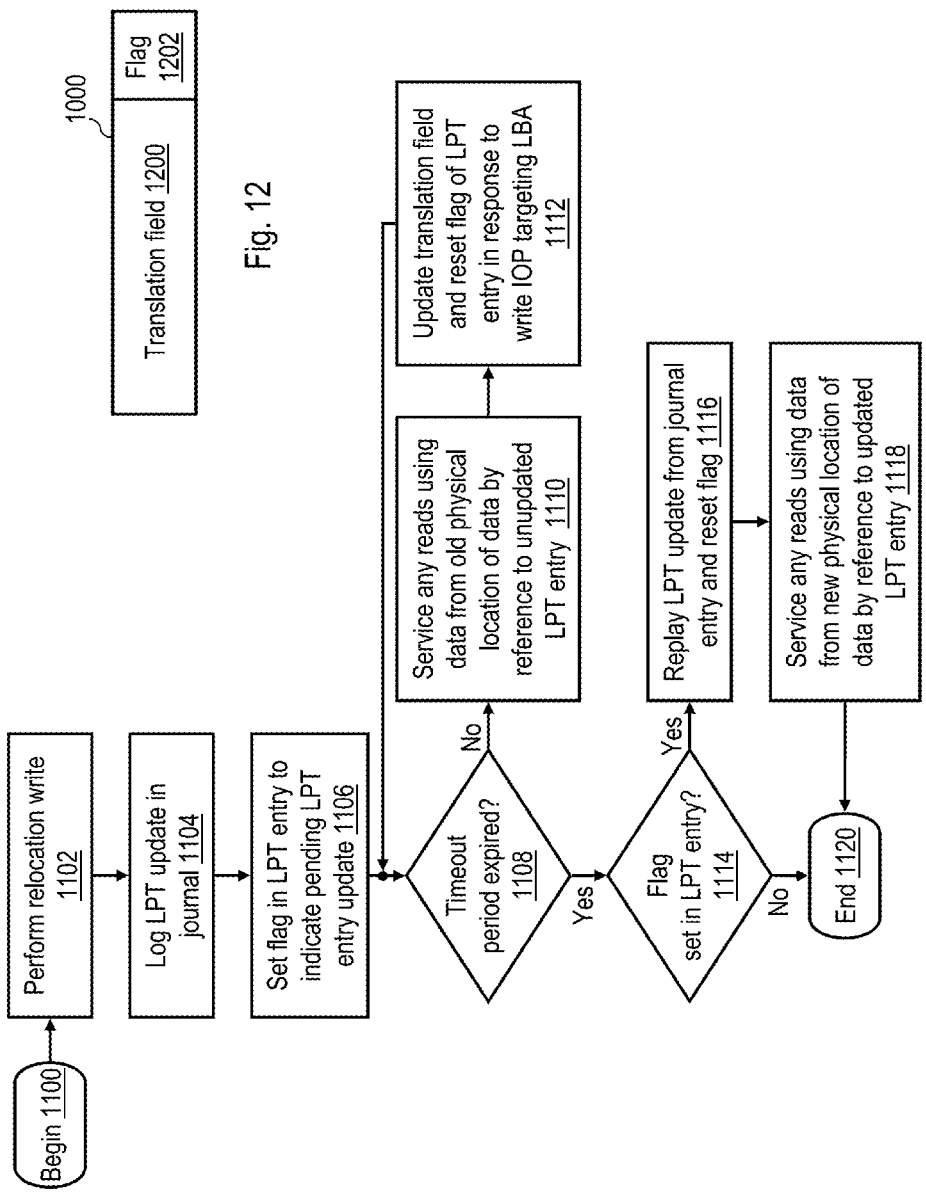

REDUCING READ-AFTER-WRITE ERRORS IN A NON-VOLATILE MEMORY SYSTEM USING AN OLD DATA COPY

BACKGROUND OF THE INVENTION

This disclosure relates to data processing and storage, and more specifically, to reducing read-after-write errors in a non-volatile memory system by temporarily servicing read requests by reference to an old data copy.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

Some NAND flash memories, referred to in the art as Single Level Cell (SLC), support only two charge states, meaning that only one bit of information can be stored per memory cell. Other NAND flash memories, referred to as Multi-Level Cell (MLC), Three Level Cell (TLC) and Quad Level Cell (QLC), respectively enable storage of 2, 3 or 4 bits of information per cell through implementation of additional charge states. The higher storage density provided by NAND flash memories capable of storing multiple bits of information per cell often comes at the cost of higher bit error rates, slower programming times, and lower endurance (e.g., in terms of lifetime program/erase (P/E) cycle counts).

In NAND flash memories in which the individual cells store multiple bits, the bits are conventionally grouped into so called "lower page," "middle page(s)" (in TLC and QLC), and "upper page." These pages are dependent, such that programming of the upper page(s) requires that the related (dependent) lower pages have already been programmed. Physically, to program an upper page, the flash chip internally first needs to read the dependent lower page(s), adjust the voltages of the lower page(s), and then write the upper page. The data contained in the lower, middle, and upper pages cannot be read immediately after writing without incurring an extremely high raw bit error rate (RBER) (potentially even an uncorrectable RBER), but can instead be correctly read only after the charge introduced by the programming operation diffuses (settles) in the cells. This period after programming during which the programmed data settles in the cells (referred to herein as the "time-out period"), is typically up to 100 ms in current NAND flash technology.

One technique employed in the art to avoid waiting for the time-out period to expire before accessing recently written data is to implement a higher-level write cache (e.g., in dynamic random access memory (DRAM)) that stores data from freshly written pages and serves it to incoming reads. One drawback of this approach is that the number of the pages that have to be stored in the higher-level write cache can be very large, especially for flash storage systems with high write throughput where pages on many planes may be written concurrently and/or flash storage systems that perform heat segregation based on the update frequency of data where pages on many segregated data streams may be written concurrently. To accommodate the anticipated data volume, the write cache can become extremely large, which can result in prohibitively complex cache search techniques and large power dissipation. The present disclosure therefore appreciates that it is desirable to provide an alternative technique of providing access to recently programmed data that does not depend on the use of a large DRAM write cache.

BRIEF SUMMARY

In at least one embodiment, following a relocation write in which data is relocated without update from an old physical location to a new physical location within the non-volatile memory array, a controller defers an update of a logical-to-physical translation (LPT) entry to associate a logical address of the data with a new physical address of the new physical location, for example, for a time-out period or a given number of write requests. During deferment of the update to the LPT entry, the controller services a read request targeting the logical address from data at the old physical location. In response to no update to the data being made during deferment of the update to the LPT entry, the controller performs the deferred update to the LPT entry. In response to an update to the data being made during the deferment of the update to the LPT entry, the controller refrains from performing the deferred update to the LPT entry.

BRIEF DESCRIPTION OF THE SEVERAL VIEWS OF THE DRAWINGS

FIGS. 2-5 illustrate an exemplary arrangement of physical memory within a NAND flash memory system in accordance with the present disclosure;

FIG. 7 illustrates an exemplary codeword stored in each data page in accordance with the present disclosure;

FIG. 8 depicts an exemplary codeword stored in each data protection page in accordance with the present disclosure;

FIG. 11 is a high level logical flowchart of an exemplary process for reducing read-after-write errors in a non-volatile memory system using an old data copy in accordance with one embodiment;

FIG. 12 depicts an exemplary embodiment of an entry of a logical-to-physical translation (LPT) table.

DETAILED DESCRIPTION

Figure 1A:
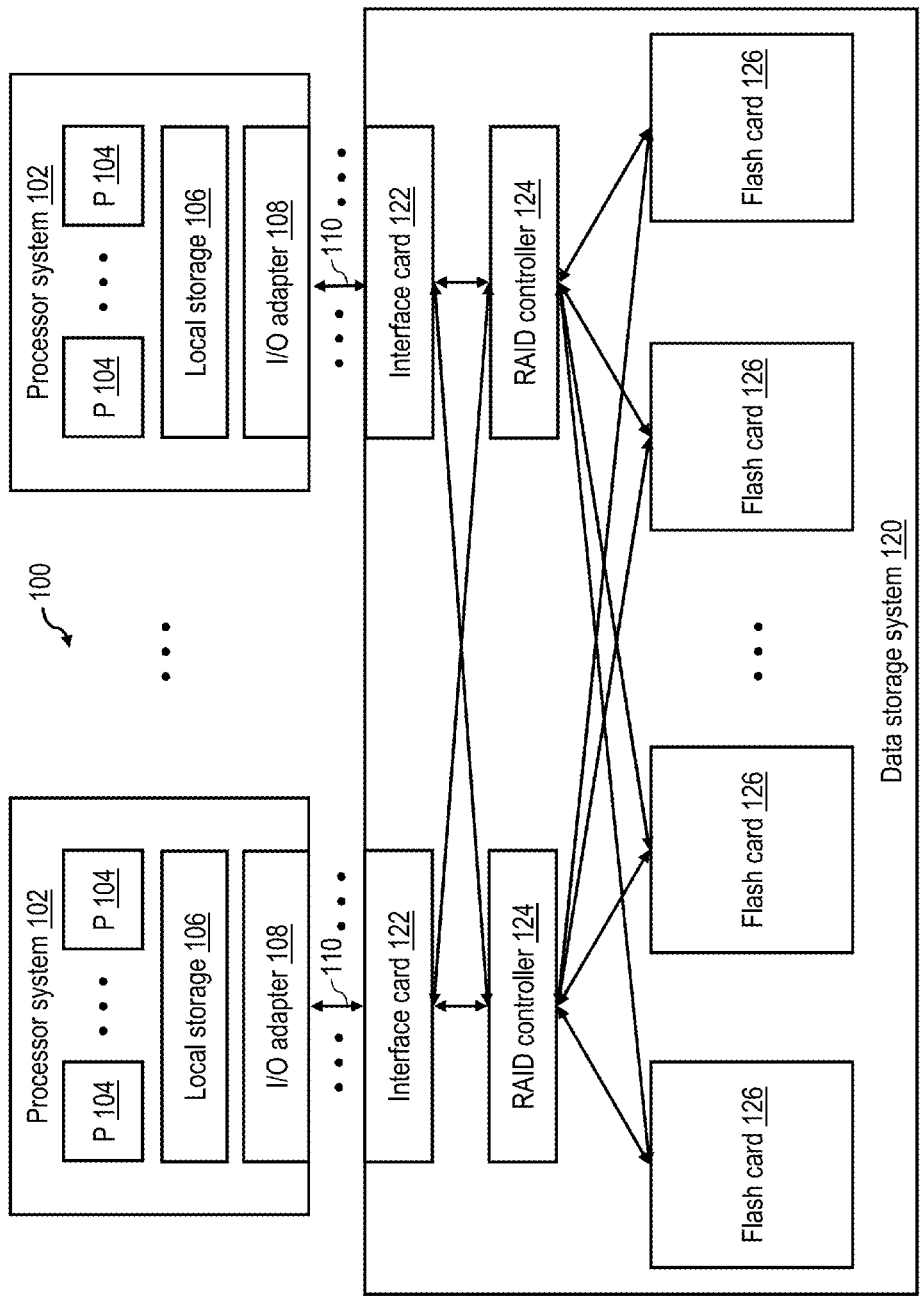
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series available from International Business Machines Corporation), or a mainframe computer system. Processor system 102 can also be an embedded processor system using various processors such as ARM, Power, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface cards 122 through which data storage system 120 receives and responds to input/output operations (IOP) 102 via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
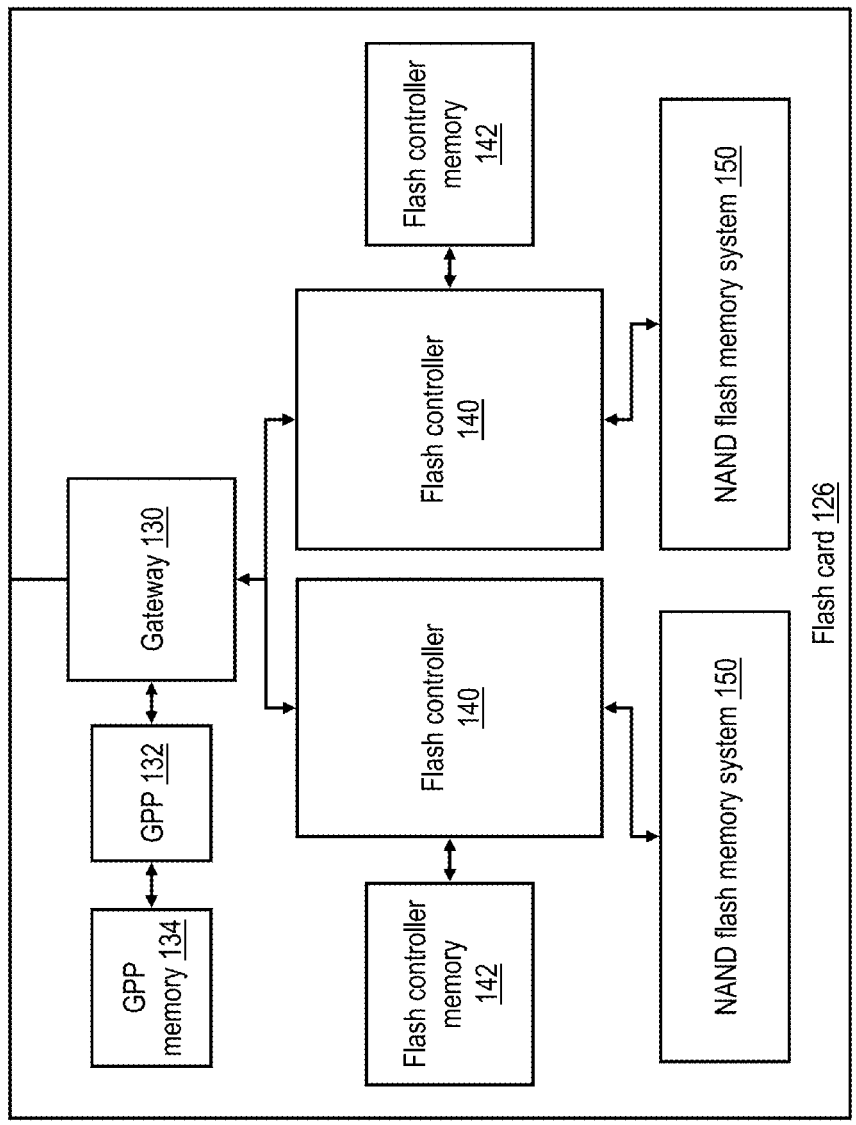
FIG. 1B is a more detailed block diagram of a flash card of the data storage system of FIG. 1A.

FIG. 1B depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1B) associated with NAND flash memory systems 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the page typically having a size of 4 kB. Therefore, more than one logical page may be stored in a physical flash page. The flash translation layer translates this LBA into a physical address assigned to a corresponding physical location in a NAND flash memory system 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
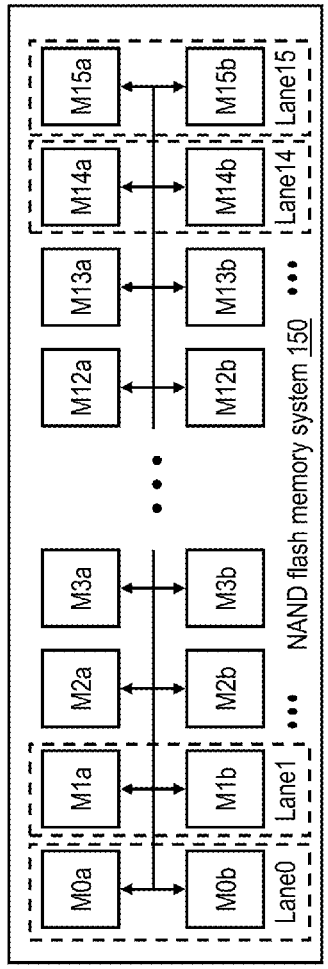

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing one or more bits per cell. Thus, flash memory modules may be implemented with Single Level Cell (SLC), Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
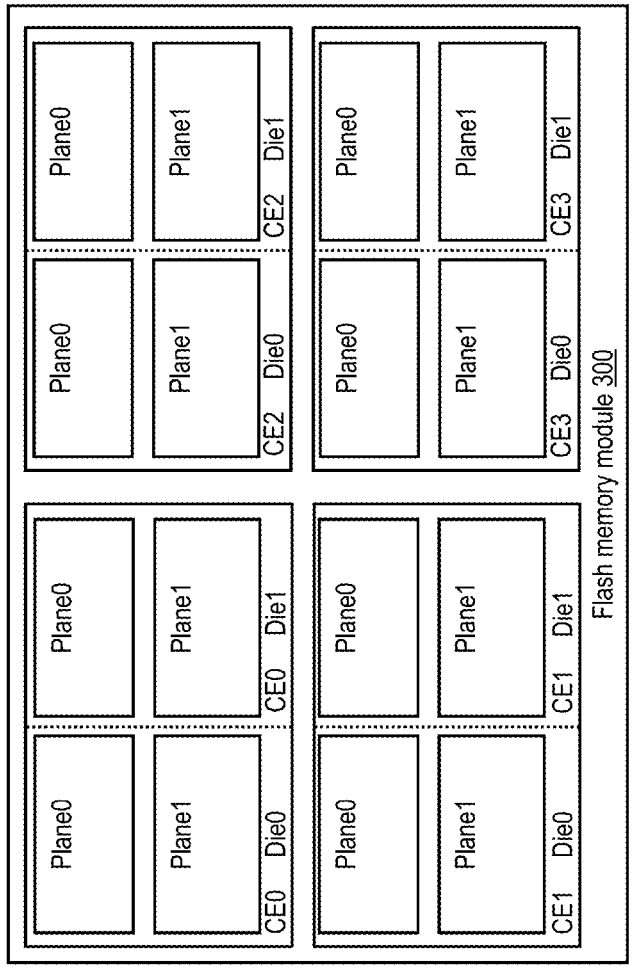

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block 500 is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

If NAND flash memory system 150 is implemented is a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer.

As further shown in FIG. 5, each block 500 preferably includes block status information (BSI) 502, which indicates the page retirement status of physical pages comprising that block 500 as retired (i.e., no longer used to store user data) or non-retired (i.e., active or still usable to store user data). In various implementations, BSI 502 can be collected into a single data structure (e.g., a vector or table) within block 500 and/or maintained elsewhere in data storage system 120. As one example, in the embodiment illustrated in FIG. 9 and discussed further below, the block status information of all blocks 500 in a NAND flash memory system 150 is collected in a system-level data structure, for example, a block status table (BST) 946 stored in GPP memory 134 or a flash controller memory 142.

Because the flash translation layer implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cycle Redundancy Check (CRC), and parity.

Figure 6A:
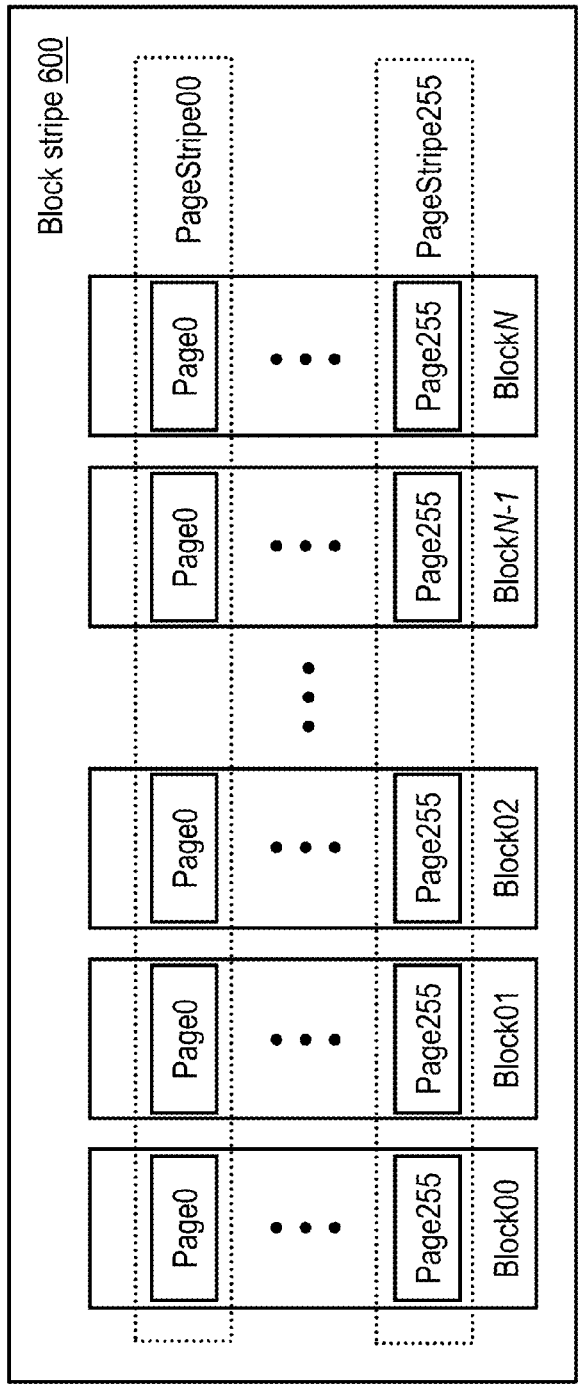
FIG. 6A depicts an exemplary implementation of a block stripe in accordance with the present disclosure.

In some embodiments, data is written to NAND flash memory system 150 one page at a time. In other embodiments in which more robust error recovery is desired, data is written to groups of associated physical pages of NAND flash memory system 150 referred to herein as "page stripes." In a preferred embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
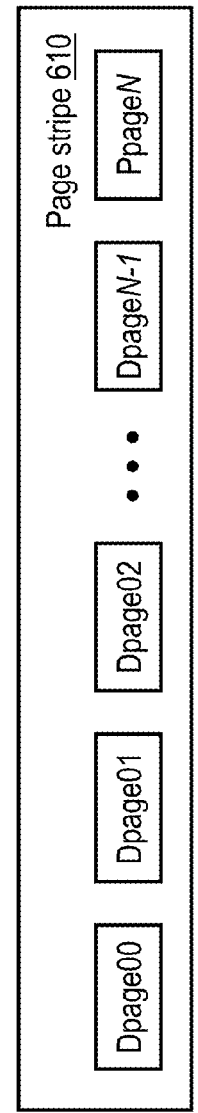
FIG. 6B depicts an exemplary implementation of a page stripe in accordance with the present disclosure.

Once a block from each lane has been selected and a block stripe is formed, page stripes are preferably formed from physical pages with the same page number (i.e., physical page index) from blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below.

FIG. 7 illustrates an exemplary format of a codeword stored in each data page within page stripe 610 of FIG. 6B. Typically, multiple codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706. In case data field 702 holds fractions of logical data pages, the LBA field 704 further holds information on which fractions of logical data pages are stored in the data field 702.

FIG. 8 depicts an exemplary format of a codeword in the data protection page of page stripe 610 of FIG. 6. In one embodiment, each data protection page stores multiple codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of the LBA fields 704 of the codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each codeword of a data page allows the correction of some number of bit errors within the codeword in a flash page. Depending on the ECC method used it may be possible correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of the RTU queues 906 corresponding to its channel.

A build block stripes function 920 performed by flash management code running on the GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data. Data placement function 910 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. Flash controller 140 also updates LPT table 900 to associate the physical page(s) utilized to store the write data with the LBA (s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 912.

Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Based on the health metrics 942 of each erased block, each erased block is either retired (i.e., no longer used to store user data) by a block retirement function 918 among the flash management functions executed on GPP 132, or alternatively, prepared for reuse by placing the block's identifier on the appropriate ready-to-use (RTU) queue 906 in the associated GPP memory 134.

Figure 9:
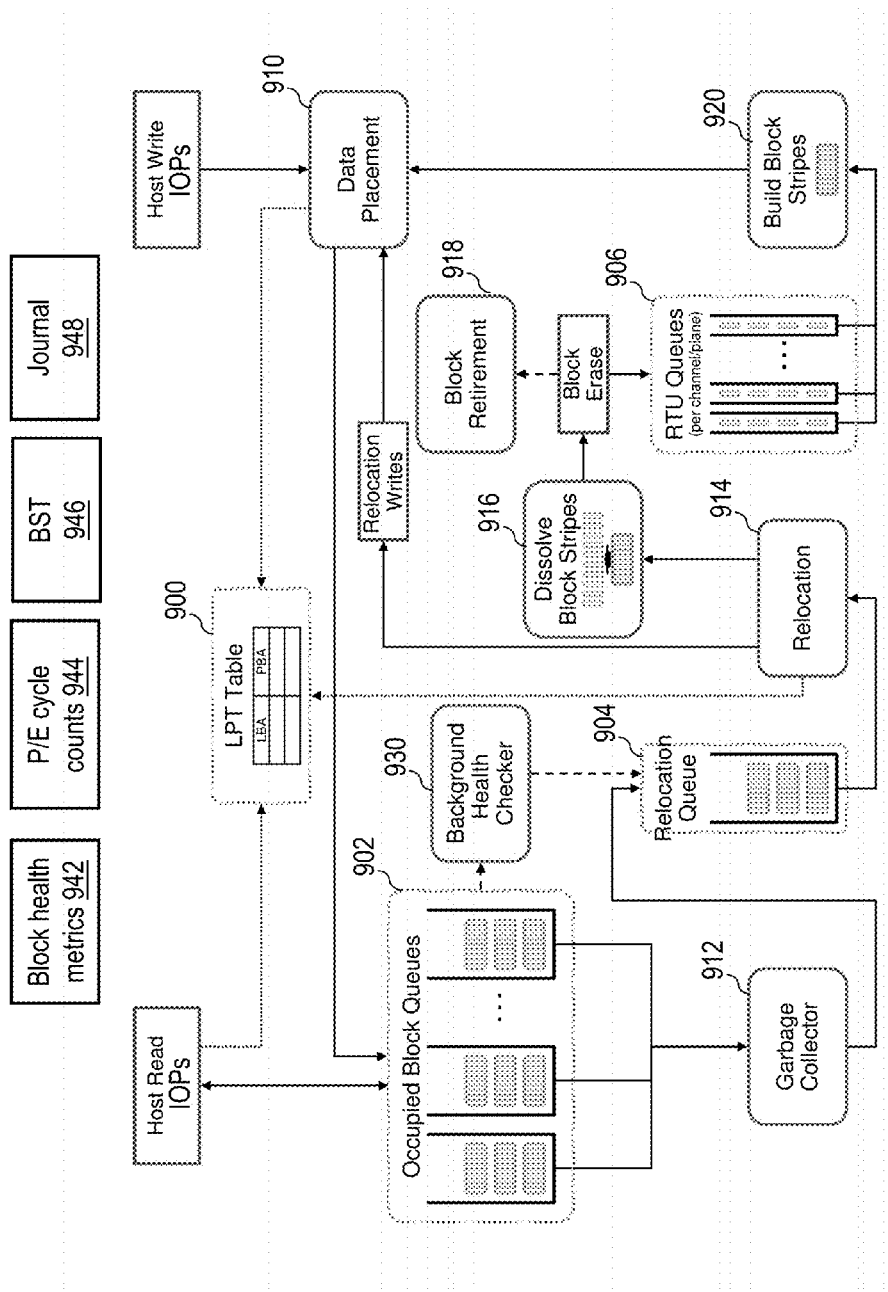
FIG. 9 is a high level flow diagram of the flash management functions and data structures employed to manage a flash memory in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 (e.g., worst page and/or mean page bit error rate (BER), programming and read voltages, etc.) for blocks belonging to block stripes recorded in occupied block queues 902. Based on the one or more of the block health metrics 942, background health checker 930 may place block stripes on relocation queue 904 for handling by relocation function 914. Thus, relocation function 914 can relocate data within the flash memory for a number of reasons, including garbage collection, block health, wear leveling, etc.

As noted above, one technique employed in the art to avoid experiencing read-after-write errors or to avoid waiting for the time-out period to expire before accessing recently written data is to implement a large scale write cache, for example, in the DRAM utilized to implement the flash controller memory. The present disclosure recognizes that read-after-write errors caused by reading recently written data and the added latency of the time-out period can alternatively be avoided for at least some classes of writes (e.g., relocation writes) by servicing read requests by reference to an old copy of the requested data.

Figure 10B:
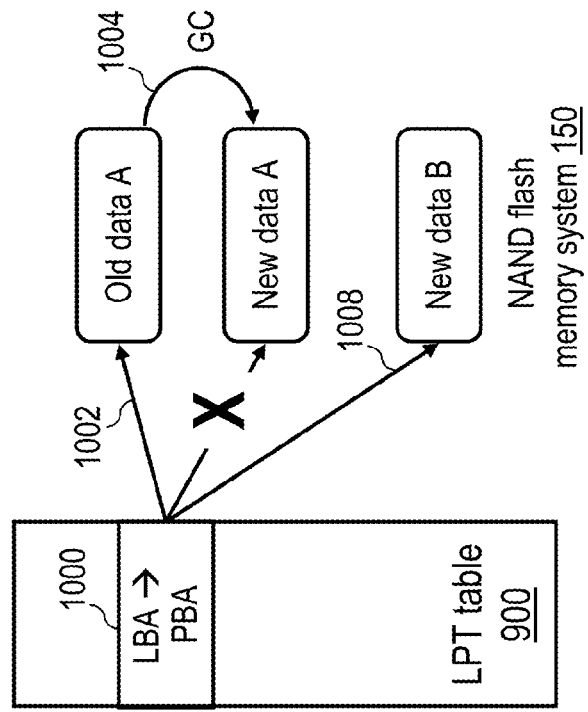
FIGS. 10A-10B illustrate a technique for reducing read-after-write errors in a non-volatile memory system by servicing read requests by reference to an old data copy for a timeout period.
Figure 10A:
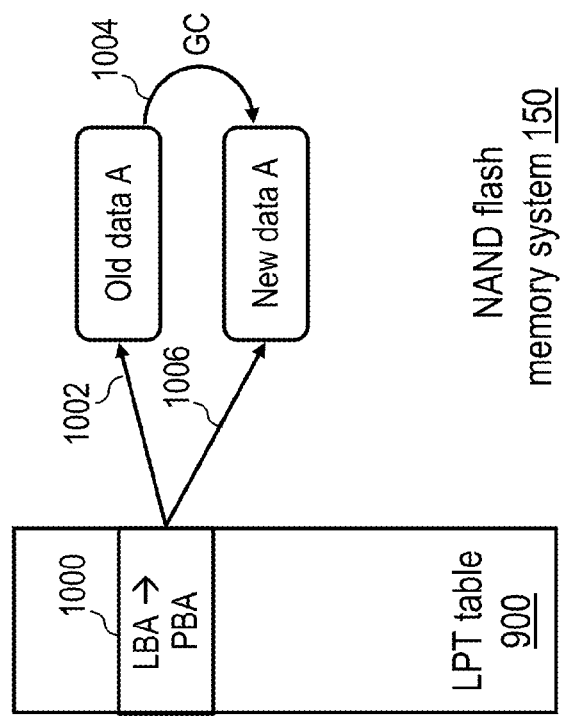

Referring now to FIGS. 10A-10B, a technique for avoiding read-after-write errors in a non-volatile memory system by servicing read requests by reference to an old data copy during a timeout period is depicted. At some arbitrary initial time, LPT table 900, which includes a respective entry for each LBA associated with a NAND flash memory system 150, includes an LPT entry 1000 that maps a given LBA to a first physical block address (PBA). The first PBA uniquely identifies a first physical location (e.g., physical page) within NAND flash memory system 150 at which data 'A' is stored, as indicated at reference numeral 1002. At some later time, shown in FIG. 10A at reference numeral 1004, a relocation write request that updates the physical location of data 'A' within NAND flash memory system 150 from the first physical location to a second physical location can be initiated, for example, by garbage collector 912 (or alternatively, by background health checker 930). Instead of immediately updating LPT entry 1000 to reflect the new second PBA of the second physical location of data 'A', the flash controller 140 defers the update to LPT entry 1000 until the time-out period of the relocation write has expired or a given number of new write requests have been processed such that a delay corresponding to minimal time-out period can be guaranteed. Because the update to LPT entry 1000 is deferred, during the time-out period flash controller 140 prevents erasure of the block containing the old copy of data 'A' and continues to service read requests for data 'A' from the old copy of data 'A' stored at the first physical location by reference to the un-updated LPT entry 1000. Because the old copy of data 'A' is not recently written, such read requests are not subject to the read-after-write errors to which reads made to new copy of data 'A' would be prone. Once the time-out period has expired and the new copy of data 'A' has settled into the memory cells at the second physical location in NAND flash memory system 150, flash controller 140 updates LPT entry 1000 to associate the LBA with the PBA of the second physical location, as indicated at reference numeral 1006. Because the time-out period has expired, subsequent reads, which are serviced using the new copy of data 'A', will not be subject to the high raw bit error rate (RBER) typically experienced by reads made within the time-out period. After expiration of the time-out period, flash controller 140 is also free to erase the block containing old data 'A'.

The scenario depicted in FIG. 10A presumes that no update is made to the data associated with the LBA during the time-out period. However, if the data associated with the LBA is updated during the time-out period, care must be taken so that LPT entry 1000 is not updated at the end of the time-out period to associate the LBA with a stale data. FIG. 10B illustrates how the prospective deferred update to LPT entry 1000 is handled in such cases.

In the scenario shown in FIG. 10B, during the time-out period an intervening user write updating the data associated with the LBA is been performed to create new data 'B' at a third physical location in NAND flash memory system 150. Flash controller 140 accordingly updates LPT entry 1000 to associate the LBA with the PBA of the third physical location, as indicated at reference numeral 1008. At the end of the time-out period associated with the relocation of data 'A', the flash controller 140 determines by reference to a data structure (e.g., a queue, table, log, etc.) whether or not during the time-out period an intervening user write targeting the LBA has been performed. If no intervening user write targeting the LBA is detected, flash controller 140 performs the deferred update to LPT entry 1000 as described in FIG. 10A. If, however, flash controller 140 detects that an intervening write targeting the LBA has been made during the time-out period, flash controller 140 refrains from updating LPT entry 1000 to associate the LBA with the second physical address (and the now-stale data 'A') at the end of the time-out period.

Multiple embodiments of the innovative technique illustrated in FIGS. 10A-10B will be apparent to skilled artisans in light of the foregoing description. Two such embodiments are described below in further detail with reference to FIGS. 11-12.

With reference now to FIG. 11, there is illustrated a high level logical flowchart of an exemplary process for reducing read-after-write errors in a non-volatile memory system using an old data copy in accordance with a first embodiment. In this first embodiment, a flash controller 140 detects an intervening write that causes a deferred update to an LPT entry 1000 to not be performed by reference to a flag within the LPT entry 1000.

The process of FIG. 11 begins at block 1100 and then proceeds to block 1102, which illustrates a flash controller 140 performing a relocation write in response to a relocation write request, as illustrated at reference numeral 1004 of FIGS. 10A-10B. In conjunction with the relocation write, flash controller 140 logs the deferred update to LPT entry 1000 in a journal (log) 948, which can conveniently be stored in the associated flash controller memory 142 (block 1104). The journal entry made at block 1104 may indicate, for example, the LBA and the new PBA with which the LBA is to be associated. In some implementations, journal 948 can be a dedicated relocation journal that logs only updates to entries of LPT table 900 associated with relocation writes. In other implementations, journal 948 may be a general LPT update journal that logs LPT updates associated with both user writes (i.e., writes performed in response to write IOPs received from processor systems 102) and relocation writes. In case a general LPT update journal is utilized, the general LPT journal preferably is configured to support extraction of the equivalent of a dedicated relocation journal. As further shown at block 1106 of FIG. 11 and in FIG. 12, in conjunction with the relocation write, flash controller 140 also sets (e.g., to '1') a flag 1202 in the LPT entry 1000 containing a translation field 1200 that translates the LBA targeted by the relocation write.

The process of FIG. 11 proceeds from block 1106 to block 1108, which illustrates flash controller 140 waiting for the time-out period associated with the relocation write performed at block 1102 to expire. As shown at block 1110, during the time-out period the flash controller 140 services any read IOPs requesting the data associated with the LBA (e.g., data 'A') by reference to the un-updated LPT entry 1000, meaning that any such read requests will be satisfied from the old copy of the data (i.e., old data 'A') residing at the first physical location unless an intervening update is made to the data. In response to receiving any write IOP targeting the LBA translated by the LPT entry 1000 during the time-out period, flash controller 140 updates translation field 1200 of LPT entry 1000 to associate the target LBA with the PBA of the new data (e.g., new data 'B') and resets (e.g., to '0') flag 1202 of LPT entry 1000, as shown at block 1112 of FIG. 11 and reference numeral 1008 of FIG. 10B.

At expiration of the time-out period, flash controller 140 determines at block 1114 whether or not the flag 1202 of LPT entry 1000 remains set. If not, flash controller 140 refrains from performing the deferred update of LPT entry 1000 associated with the relocation write, thereby implicitly invalidating the relocated copy of the data (i.e., new data 'A'), and the process of FIG. 11 ends at block 1120. If, on the other hand, flash controller 140 determines at block 1114 that flag 1202 of LPT entry 1000 remains set, the process proceeds from block 1114 to block 1116. Block 1116 depicts flash controller 140 performing the deferred update to LPT entry 1000 associated with the relocation write performed at block 1102 by replaying the LPT update from the entry made in journal 948 at block 1104. (This deferred update is further illustrated at reference numeral 1006 of FIG. 10A.) Flash controller 140 may additionally reset flag 1202 in LPT entry 1000 to signify completion of the deferred LPT update. In another embodiment, the bit is reset later by a background process. As indicated at block 1118, following the deferred update to the LPT entry 1000, flash controller 140 services any read requests targeting the LBA by reference to the updated LPT entry 1000, meaning that any such read request is satisfied from the new copy of the data (e.g., new data 'A') until it is relocated or updated. Following block 1118, the process of FIG. 11 ends at block 1120.

Figure 13:
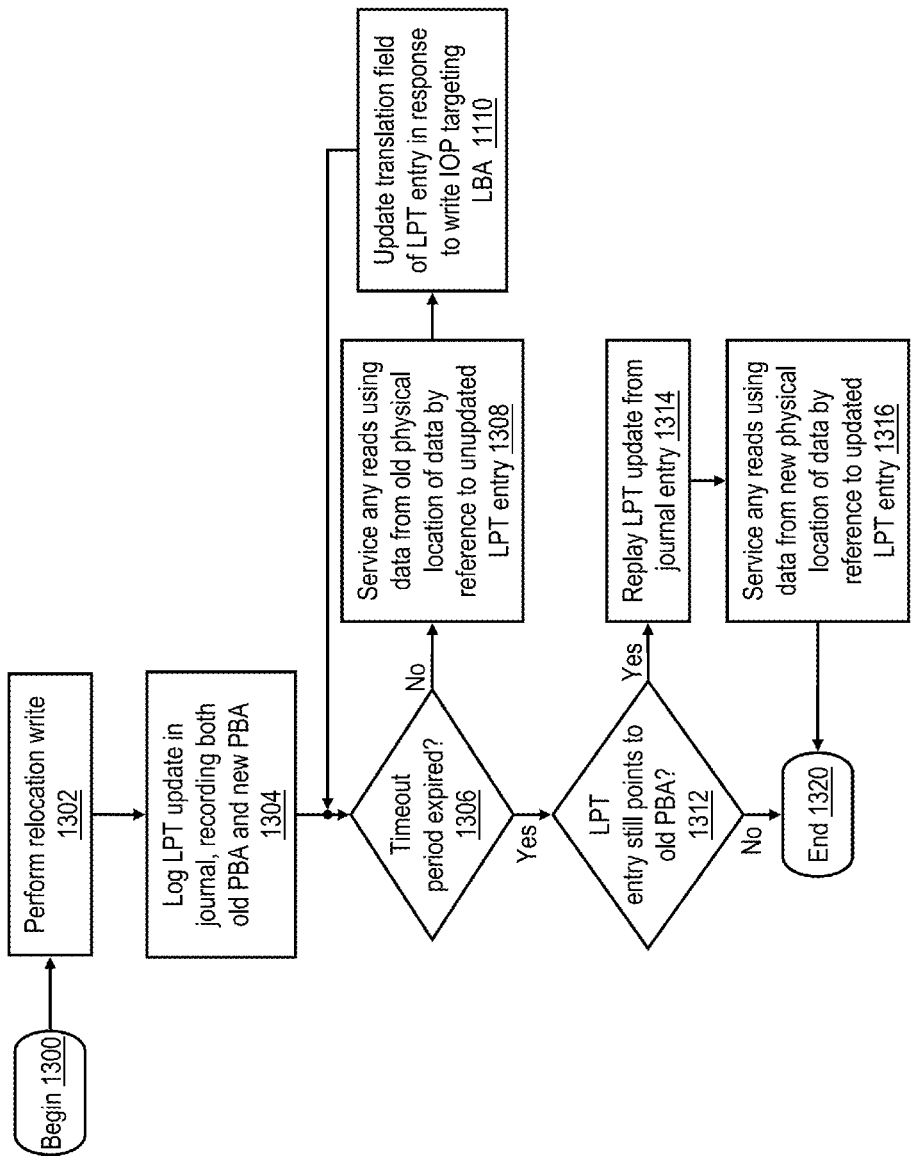
FIG. 13 is a high level logical flowchart of an exemplary process for reducing read-after-write errors in a non-volatile memory system using an old data copy in accordance with another embodiment.

FIG. 13 is a high level logical flowchart of an exemplary process for reducing read-after-write errors in a non-volatile memory system using an old data copy in accordance with a second embodiment. In this second embodiment, a flash controller 140 detects by reference to an entry in journal 948 whether an intervening write has been performed that causes a deferred update to an LPT entry 1000 to not be performed. Accordingly, in the second embodiment each LPT entry 1000 can include only a translation field 1200 and need not include a flag 1202 as shown in FIG. 12.

The process of FIG. 13 begins at block 1300 and then proceeds to block 1302, which illustrates a flash controller 140 performing a relocation write, as illustrated at reference numeral 1004 of FIGS. 10A-10B. In conjunction with the relocation write, flash controller 140 logs the deferred update to LPT entry 1000 in journal 948. To facilitate detection of intervening writes targeting the LBA translated by LPT entry 1000, the journal entry made at block 1304 preferably records not only the LBA and the new PBA with which the LBA is to be associated, but also the old PBA with which the LBA is currently associated by the LPT entry 1000.

The process of FIG. 13 proceeds from block 1304 to block 1306, which illustrates flash controller 140 waiting for the time-out period associated with the relocation write performed at block 1302 to expire. As shown at block 1308, during the time-out period the flash controller 140 services any read IOPs requesting the data associated with the LBA (e.g., data 'A') by reference to the un-updated LPT entry 1000, meaning that any such read requests will be satisfied from the old copy of the data (i.e., old data 'A') unless an intervening update is made to the data. In response to receiving any write IOP targeting the LBA translated by the LPT entry 1000 during the time-out period, flash controller 140 updates translation field 1200 of the LPT entry 1000 to associate the target LBA with the PBA of the new data (e.g., new data 'B'), as shown at block 1110 of FIG. 11 and reference numeral 1008 of FIG. 10B.

At expiration of the time-out period, flash controller 140 determines at block 1312 whether or not translation field 1200 of LPT entry 1000 still associates the LBA with the old PBA recorded in the entry of journal 948 at block 1304. If not, flash controller 140 refrains from performing the deferred update of LPT entry 1000 associated with the relocation write, and the process of FIG. 13 ends at block 1320. If, on the other hand, flash controller 140 determines at block 1312 that LPT entry 1000 still associates the LBA with the old PBA recorded in journal 948, the process proceeds from block 1312 to block 1314. Block 1314 depicts flash controller 140 performing the deferred update to LPT entry 1000 associated with the relocation write performed at block 1302 by replaying the LPT update from the entry made in journal 948 at block 1304 and proceeds to block 1316. As indicated at block 1316, following the deferred update to the LPT entry 1000, flash controller 140 services any read requests targeting the LBA by reference to the updated LPT entry 1000, meaning that any such read request is satisfied from the new copy of the data (e.g., new data 'A') until it is relocated or updated. Following block 1316, the process of FIG. 13 ends at block 1320.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, following a relocation write in which data is relocated without update from an old physical location to a new physical location within the non-volatile memory array, a controller defers an update of a logical-to-physical translation (LPT) entry to associate a logical address of the data with a new physical address of the new physical location, for example, for a time-out period. During deferment of the update to the LPT entry, the controller services a read request targeting the logical address from data at the old physical location. In response to no update to the data being made during deferment of the update to the LPT entry, the controller performs the deferred update to the LPT entry. In response to an update to the data being made during the deferment of the update to the LPT entry, the controller refrains from performing the deferred update to the LPT entry.

In many flash storage systems operating under certain workloads, relocation writes may account for two to three times as many writes as host writes. The disclosed technique eliminates the need to cache write data associated with relocation writes (e.g., in a DRAM write cache residing in flash controller memory 142), which can effectively reduce the required size of the write cache, if present, by two or three times.

It should also be noted that the described technique can also be used to support relocation writes to one or more physical location(s) that is/are close to retirement. In this application, the update to the LPT table entry can be deferred until data from a new physical location is verified to be readable (i.e., ECC can decode the data) and identical to data residing at the old physical location. This read-verify process provides increased assurance that the data will subsequently be readable at the new physical location. In case the data cannot be decoded at the new physical location by the read-verify process, the data can again be relocated to another block, and a read-verify operation can again be attempted. In response to a successful read-verify following a relocation write, the controller conditionally performs the update to the LPT table entry based on whether or not the data has been updated during deferment of the update to the LPT table entry.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude energy per se, transmission media per se, and transitory propagating signals per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a non-volatile memory array controlled by a controller, wherein the non-volatile memory array includes a plurality of blocks each including a plurality of physical pages, the method comprising:
 following a relocation write in which data is relocated without update from an old physical location to a new physical location within the non-volatile memory array, the controller deferring an update of a logical-to-physical translation (LPT) entry to associate a logical address of the data with a new physical address of the new physical location;
 during deferment of the update to the LPT entry, the controller servicing a read request targeting the logical address from data at the old physical location;
 in response no update to the data being made during deferment of the update to the LPT entry, the controller performing the deferred update to the LPT entry; and
 in response to an update to the data being made during deferment of the update to the LPT entry, the controller refraining from performing the deferred update to the LPT entry.

2. The method of claim 1, and further comprising performing the relocation write as part of a garbage collection process.

3. The method of claim 1, wherein:
 the method further comprises in conjunction with the relocation write recording the update of the LPT entry in a journal entry; and
 performing the deferred update includes replaying the update of the LPT entry from the journal entry.

4. The method of claim 1, and further comprising detecting an update to the data during deferment of the update to the LPT entry by reference to a flag in the LPT entry.

5. The method of claim 4, wherein the detecting includes:
 setting the flag in response to the relocation write; and
 detecting an update to the data during deferment of the update to the LPT entry based on whether the flag is set or reset.

6. The method of claim 5, and further comprising resetting the flag in response to an update to the data during deferment of the update to the LPT entry.

7. The method of claim 1, and further comprising:
 in conjunction with the relocation write, recording, in a journal entry, the update of the LPT entry, wherein the journal entry includes an old physical address of the old physical location; and
 detecting an update to the data during deferment of the update to the LPT entry based on whether the LPT entry associates the logical address with the old physical address recorded in the journal entry.

8. A data storage system, comprising:
 a controller configured to be coupled to a non-volatile memory array including a plurality of blocks each including a plurality of physical pages, wherein the controller, following a relocation write in which data is relocated without update from an old physical location to a new physical location within the non-volatile memory array, defers an update of a logical-to-physical translation (LPT) entry to associate a logical address of the data with a new physical address of the new physical location, wherein the controller, during deferment of the LPT update, services a read request targeting the logical address from data at the old physical location, and wherein the controller, responsive to no update to the data being made during deferment of the update to the LPT entry, performs the deferred update to the LPT entry and refrains from performing the deferred update otherwise.

9. The data storage system of claim 8, wherein the relocation write is a garbage collection write.

10. The data storage system of claim 8, wherein:
 the controller, in conjunction with the relocation write, records the update of the LPT entry in a journal entry; and
 the controller performs the deferred update by replaying the update of the LPT entry from the journal entry.

11. The data storage system of claim 8, wherein the controller detects an update to the data during deferment of the update to the LPT entry by reference to a flag in the logical-to-physical address translation entry.

12. The data storage system of claim 11, wherein:
 the controller sets the flag in response to the relocation write and resets the flag in response to an update to the data during deferment of the update to the LPT entry; and
 the controller detects an update to the data during deferment of the update to the LPT entry based on whether the flag is set or reset.

13. The data storage system of claim 8, wherein:
 the controller, in conjunction with the relocation write, records, in a journal entry, the update of the logical-to-physical address translation entry, wherein the journal entry includes an old physical address of the old physical location; and
 the controller detects an update to the data during deferment of the update to the LPT entry based on whether the logical-to-physical address translation entry associates the logical address with the old physical address recorded in the journal entry.

14. The data storage system of claim 8, and further comprising the non-volatile memory array coupled to the controller.

15. A computer program product, the computer program product comprising a computer readable storage medium having program instructions embodied therewith, the program instructions executable by a controller for a non-volatile memory array including a plurality of blocks each including a plurality of physical pages, to cause the controller to perform:
 following a relocation write in which data is relocated without update from an old physical location to a new physical location within the non-volatile memory array, deferring an update of a logical-to-physical translation (LPT) entry to associate a logical address of the data with a new physical address of the new physical location;
 during deferment of the update to the LPT entry, servicing a read request targeting the logical address from data at the old physical location;

in response to no update to the data being made during deferment of the update to the LPT entry, performing the deferred update to the LPT entry; and in response an update being made to the data during deferment of the update to the LPT entry, refraining from performing the deferred update to the LPT entry.

16. The program product of claim 15, wherein the program code, when executed by the controller, further causes the controller to perform the relocation write as part of a garbage collection process.

17. The program product of claim 15, wherein:
the program code, when executed by the controller, further causes the controller to perform, in conjunction with the relocation write, recording the update of the logical-to-physical address translation entry in a journal entry; and
performing the deferred update includes replaying the update of the logical-to-physical address translation entry from the journal entry.

18. The program product of claim 15, the program code, when executed by the controller, further causes the controller to perform detecting an update to the data during deferment of the update to the LPT entry by reference to a flag in the logical-to-physical address translation entry.

19. The program product of claim 18, wherein the detecting includes:
setting the flag in response to the relocation write; and
detecting an update to the data during deferment of the update to the LPT entry based on whether the flag is set or reset.

20. The program product of claim 15, wherein the program code, when executed by the controller, further causes the controller to perform:
in conjunction with the relocation write, recording in a journal entry the update of the logical-to-physical address translation entry, wherein the journal entry includes an old physical address of the old physical location; and
detecting an update to the data during deferment of the update to the LPT entry based on whether the logical-to-physical address translation entry associates the logical address with the old physical address recorded in the journal entry.

\* \* \* \* \*